United States Patent
Gabardos et al.

(10) Patent No.: US 10,001,780 B2
(45) Date of Patent: Jun. 19, 2018

(54) SYSTEMS AND METHODS FOR DYNAMIC ROUTE PLANNING IN AUTONOMOUS NAVIGATION

(71) Applicant: BRAIN CORPORATION, San Diego, CA (US)

(72) Inventors: Borja Ibarz Gabardos, La Jolla, CA (US); Jean-Baptiste Passot, Solana Beach, CA (US)

(73) Assignee: Brain Corporation, San Diego, CA (US)

( * ) Notice: Subject to any disclaimer, the term of this patent is extended or adjusted under 35 U.S.C. 154(b) by 14 days.

(21) Appl. No.: 15/341,612

(22) Filed: Nov. 2, 2016

(65) Prior Publication Data

US 2018/0120856 A1    May 3, 2018

(51) Int. Cl.
  *G05D 1/02*     (2006.01)
  *G05D 1/00*     (2006.01)
  (Continued)

(52) U.S. Cl.
  CPC ........ *G05D 1/0214* (2013.01); *A47L 11/4011* (2013.01); *G01C 21/343* (2013.01);
  (Continued)

(58) Field of Classification Search
  CPC .. G05D 1/0214; G05D 1/0276; G05D 1/0088; G05D 2201/3415; G01C 21/343; G01C 21/3415; A47L 11/4011
  See application file for complete search history.

(56) References Cited

U.S. PATENT DOCUMENTS 4,638,445 A    1/1987 Mattaboni
4,763,276 A    8/1988 Perreirra et al.
(Continued)

FOREIGN PATENT DOCUMENTS

WO    WO-0167749 A2    9/2001
WO    WO-2014196925 A1    12/2014
WO    WO-2015047195 A1    4/2015

OTHER PUBLICATIONS

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet:http://msc.berkeley.edu/wjchen/publications/DSC12.sub.--8726.sub.--FI-.pdf<http: />, 11 pgs.
(Continued)

*Primary Examiner* — Russell Frejd
(74) *Attorney, Agent, or Firm* — Gazdzinski & Associates, PC

(57) ABSTRACT

Systems and methods for dynamic route planning in autonomous navigation are disclosed. In some exemplary implementations, a robot can have one or more sensors configured to collect data about an environment including detected points on one or more objects in the environment. The robot can then plan a route in the environment, where the route can comprise one or more route poses. The route poses can include a footprint indicative at least in part of a pose, size, and shape of the robot along the route. Each route pose can have a plurality of points therein. Based on forces exerted on the points of each route pose by other route poses, objects in the environment, and others, each route pose can reposition. Based at least in part on interpolation performed on the route poses (some of which may be repositioned), the robot can dynamically route.

20 Claims, 12 Drawing Sheets

(51) Int. Cl.
*G01C 21/34* (2006.01)
*A47L 11/40* (2006.01)

(52) U.S. Cl.
CPC ....... *G01C 21/3415* (2013.01); *G05D 1/0088* (2013.01); *G05D 1/0276* (2013.01); *G05D 2201/0203* (2013.01)

(56) References Cited

U.S. PATENT DOCUMENTS

| | | | |
|---|---|---|---|
| 4,852,018 | A | 7/1989 | Grossberg et al. |
| 5,121,497 | A | 6/1992 | Kerr et al. |
| 5,280,179 | A | 1/1994 | Pryor et al. |
| 5,446,356 | A | 8/1995 | Kim |
| 5,602,761 | A | 2/1997 | Spoerre et al. |
| 5,612,883 | A | 3/1997 | Shaffer et al. |
| 5,673,367 | A | 9/1997 | Buckley |
| 5,719,480 | A | 2/1998 | Bock et al. |
| 5,841,959 | A | 11/1998 | Guiremand |
| 5,994,864 | A | 11/1999 | Inoue et al. |
| 6,124,694 | A | 9/2000 | Bancroft et al. |
| 6,169,981 | B1 | 1/2001 | Werbos |
| 6,243,622 | B1 | 6/2001 | Yim et al. |
| 6,366,293 | B1 | 4/2002 | Hamilton et al. |
| 6,442,451 | B1 | 8/2002 | Lapham |
| 6,560,511 | B1 | 5/2003 | Yokoo et al. |
| 6,584,375 | B2 | 6/2003 | Bancroft et al. |
| 6,636,781 | B1 | 10/2003 | Shen et al. |
| 6,697,711 | B2 | 2/2004 | Yokono et al. |
| 6,760,645 | B2 | 7/2004 | Kaplan et al. |
| 6,812,846 | B2 | 11/2004 | Gutta et al. |
| 6,961,060 | B1 | 11/2005 | Mochizuki et al. |
| 7,002,585 | B1 | 2/2006 | Watanabe et al. |
| 7,148,644 | B2 | 12/2006 | Yourlo et al. |
| 7,212,651 | B2 | 5/2007 | Viola et al. |
| 7,243,334 | B1 | 7/2007 | Berger et al. |
| 7,342,589 | B2 | 3/2008 | Miserocchi |
| 7,576,639 | B2 | 8/2009 | Boyles et al. |
| 7,668,605 | B2 | 2/2010 | Braun et al. |
| 8,145,492 | B2 | 3/2012 | Fujita |
| 8,174,568 | B2 * | 5/2012 | Samarasekera ...... G01C 21/005 348/113 |
| 8,364,314 | B2 | 1/2013 | Abdallah et al. |
| 8,380,348 | B2 | 2/2013 | Neki et al. |
| 8,380,652 | B1 | 2/2013 | Francis, Jr. |
| 8,419,804 | B2 | 4/2013 | Herr et al. |
| 8,423,225 | B2 | 4/2013 | Hillman, Jr. et al. |
| 8,452,448 | B2 | 5/2013 | Pack et al. |
| 8,514,236 | B2 | 8/2013 | Wang et al. |
| 8,515,162 | B2 | 8/2013 | Cheng |
| 8,639,035 | B2 | 1/2014 | Shiba |
| 8,639,644 | B1 | 1/2014 | Hickman et al. |
| 8,679,260 | B2 | 3/2014 | Hillman, Jr. et al. |
| 8,793,205 | B1 | 7/2014 | Fisher et al. |
| 8,843,244 | B2 * | 9/2014 | Phillips ................ G05D 1/0038 701/2 |
| 8,924,021 | B2 | 12/2014 | Dariush et al. |
| 8,958,911 | B2 | 2/2015 | Wong et al. |
| 8,958,912 | B2 | 2/2015 | Blumberg et al. |
| 8,958,937 | B2 | 2/2015 | Hillman, Jr. et al. |
| 9,008,840 | B1 | 4/2015 | Ponulak et al. |
| 9,015,093 | B1 | 4/2015 | Commons |
| 9,144,907 | B2 | 9/2015 | Summer et al. |
| 9,242,372 | B2 | 1/2016 | Laurent et al. |
| 9,746,339 | B2 | 8/2017 | Mattila et al. |
| 2002/0107649 | A1 | 8/2002 | Takiguchi et al. |
| 2002/0158599 | A1 | 10/2002 | Fujita et al. |
| 2002/0175894 | A1 | 11/2002 | Grillo |
| 2002/0198854 | A1 | 12/2002 | Berenji et al. |
| 2003/0023347 | A1 | 1/2003 | Konno et al. |
| 2003/0025082 | A1 | 2/2003 | Brewington et al. |
| 2003/0108415 | A1 | 6/2003 | Hosek et al. |
| 2003/0144764 | A1 | 7/2003 | Yokono et al. |
| 2003/0220714 | A1 | 11/2003 | Nakamura et al. |
| 2004/0030449 | A1 | 2/2004 | Solomon |
| 2004/0036437 | A1 | 2/2004 | Ito |
| 2004/0051493 | A1 | 3/2004 | Furuta et al. |
| 2004/0167641 | A1 | 8/2004 | Kawai et al. |
| 2004/0172166 | A1 | 9/2004 | Lapstun et al. |
| 2004/0172168 | A1 | 9/2004 | Watanabe et al. |
| 2004/0267404 | A1 | 12/2004 | Danko |
| 2005/0008227 | A1 | 1/2005 | Duan et al. |
| 2005/0065651 | A1 | 3/2005 | Ayers et al. |
| 2005/0069207 | A1 | 3/2005 | Zakrzewski et al. |
| 2005/0125099 | A1 | 6/2005 | Mikami et al. |
| 2006/0207419 | A1 | 9/2006 | Okazaki et al. |
| 2006/0250101 | A1 | 11/2006 | Khatib et al. |
| 2007/0074177 | A1 | 3/2007 | Kurita et al. |
| 2007/0151389 | A1 | 7/2007 | Prisco et al. |
| 2007/0200525 | A1 | 8/2007 | Kanaoka |
| 2007/0255454 | A1 | 11/2007 | Dariush et al. |
| 2007/0260356 | A1 | 11/2007 | Kock et al. |
| 2008/0040040 | A1 | 2/2008 | Goto et al. |
| 2008/0059015 | A1 * | 3/2008 | Whittaker ............ G05D 1/0274 701/23 |
| 2008/0097644 | A1 | 4/2008 | Kaznov et al. |
| 2008/0112596 | A1 | 5/2008 | Rhoads et al. |
| 2008/0140257 | A1 | 6/2008 | Sato et al. |
| 2008/0319929 | A1 | 12/2008 | Kaplan et al. |
| 2009/0037033 | A1 | 2/2009 | Phillips et al. |
| 2009/0231359 | A1 | 9/2009 | Bass, II et al. |
| 2009/0234501 | A1 | 9/2009 | Ishizaki |
| 2009/0265036 | A1 | 10/2009 | Jamieson et al. |
| 2009/0272585 | A1 | 11/2009 | Nagasaka |
| 2010/0114372 | A1 | 5/2010 | Knuth, Jr. et al. |
| 2010/0152896 | A1 | 6/2010 | Komatsu et al. |
| 2010/0152899 | A1 | 6/2010 | Chang et al. |
| 2010/0228264 | A1 | 9/2010 | Robinson et al. |
| 2010/0286824 | A1 | 11/2010 | Solomon |
| 2010/0305758 | A1 | 12/2010 | Nishi et al. |
| 2010/0312730 | A1 | 12/2010 | Weng et al. |
| 2011/0026770 | A1 | 2/2011 | Brookshire |
| 2011/0035188 | A1 | 2/2011 | Martinez-Heras et al. |
| 2011/0060460 | A1 | 3/2011 | Oga et al. |
| 2011/0067479 | A1 | 3/2011 | Davis et al. |
| 2011/0144802 | A1 | 6/2011 | Jang |
| 2011/0158476 | A1 | 6/2011 | Fahn et al. |
| 2011/0160906 | A1 | 6/2011 | Orita et al. |
| 2011/0160907 | A1 | 6/2011 | Orita |
| 2011/0196199 | A1 | 8/2011 | Donhowe et al. |
| 2011/0218676 | A1 | 9/2011 | Okazaki |
| 2011/0244919 | A1 | 10/2011 | Aller et al. |
| 2011/0282169 | A1 | 11/2011 | Grudic et al. |
| 2011/0296944 | A1 | 12/2011 | Carter et al. |
| 2012/0008838 | A1 | 1/2012 | Guyon et al. |
| 2012/0017232 | A1 | 1/2012 | Hoffberg et al. |
| 2012/0045068 | A1 | 2/2012 | Kim et al. |
| 2012/0072166 | A1 | 3/2012 | Keal et al. |
| 2012/0079670 | A1 | 4/2012 | Yoon et al. |
| 2012/0109150 | A1 | 5/2012 | Quaid et al. |
| 2012/0143495 | A1 | 6/2012 | Dantu |
| 2012/0144242 | A1 | 6/2012 | Vichare et al. |
| 2012/0150777 | A1 | 6/2012 | Setoguchi et al. |
| 2012/0209432 | A1 | 8/2012 | Fleischer et al. |
| 2012/0221147 | A1 | 8/2012 | Goldberg et al. |
| 2012/0303091 | A1 | 11/2012 | Izhikevich |
| 2012/0303160 | A1 | 11/2012 | Ziegler et al. |
| 2012/0308076 | A1 | 12/2012 | Piekniewski et al. |
| 2012/0308136 | A1 | 12/2012 | Izhikevich et al. |
| 2013/0000480 | A1 | 1/2013 | Komatsu et al. |
| 2013/0044139 | A1 | 2/2013 | Hernandez |
| 2013/0066468 | A1 | 3/2013 | Choi et al. |
| 2013/0096719 | A1 | 4/2013 | Sanders et al. |
| 2013/0116827 | A1 | 5/2013 | Inazumi |
| 2013/0173060 | A1 | 7/2013 | Yoo et al. |
| 2013/0206170 | A1 | 8/2013 | Svendsen et al. |
| 2013/0218339 | A1 | 8/2013 | Maisonnier et al. |
| 2013/0245829 | A1 | 9/2013 | Ohta et al. |
| 2013/0274924 | A1 | 10/2013 | Chung et al. |
| 2013/0310979 | A1 | 11/2013 | Herr et al. |
| 2013/0325775 | A1 | 12/2013 | Sinyavskiy et al. |
| 2013/0346347 | A1 | 12/2013 | Patterson et al. |
| 2014/0002843 | A1 | 1/2014 | Miyamoto et al. |
| 2014/0016858 | A1 | 1/2014 | Richert |

(56) References Cited

U.S. PATENT DOCUMENTS

| | | |
|---|---|---|
| 2014/0081895 A1 | 3/2014 | Coenen et al. |
| 2014/0089232 A1 | 3/2014 | Buibas et al. |
| 2014/0114479 A1 | 4/2014 | Okazaki |
| 2014/0187519 A1 | 7/2014 | Cooke et al. |
| 2014/0190514 A1 | 7/2014 | Lamon et al. |
| 2014/0276951 A1 | 9/2014 | Hourtash et al. |
| 2014/0277718 A1 | 9/2014 | Izhikevich et al. |
| 2014/0350723 A1 | 11/2014 | Prieto et al. |
| 2014/0358828 A1 | 12/2014 | Phillipps et al. |
| 2014/0371907 A1 | 12/2014 | Passot et al. |
| 2014/0371912 A1 | 12/2014 | Passot et al. |
| 2015/0032258 A1 | 1/2015 | Passot et al. |
| 2015/0094850 A1 | 4/2015 | Passot et al. |
| 2015/0094852 A1 | 4/2015 | Laurent et al. |
| 2015/0120128 A1 | 4/2015 | Rosenstein et al. |
| 2015/0127155 A1 | 5/2015 | Passot et al. |
| 2015/0185027 A1 | 7/2015 | Kikkeri et al. |
| 2015/0199458 A1 | 7/2015 | Bacon et al. |
| 2015/0204559 A1 | 7/2015 | Hoffberg et al. |
| 2015/0213299 A1 | 7/2015 | Solano et al. |
| 2015/0283703 A1 | 10/2015 | Izhikevich et al. |
| 2015/0306761 A1 | 10/2015 | O'Connor et al. |
| 2015/0317357 A1 | 11/2015 | Harmsen et al. |
| 2015/0339589 A1 | 11/2015 | Fisher |
| 2016/0057925 A1 | 3/2016 | Letsky |
| 2016/0075026 A1 | 3/2016 | Sisbot et al. |
| 2016/0078303 A1* | 3/2016 | Samarasekera ...... G01C 21/005 348/47 |
| 2016/0182502 A1 | 6/2016 | Smith et al. |
| 2016/0282862 A1 | 9/2016 | Duffley et al. |
| 2016/0309973 A1 | 10/2016 | Sheikh et al. |
| 2017/0329333 A1* | 11/2017 | Passot ................. G05D 1/0088 |
| 2017/0329347 A1* | 11/2017 | Passot ................. G05D 1/0274 |

OTHER PUBLICATIONS

Bouganis, Alexandros, et al.,"Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.

Brown, et al., Detecting Problems in Buildings Using Infrared Cameras, Fluke Digital Library, retrieved on Jun. 8, 2015 from the Web address: www.fluke.com/library, 3 pgs.

Coupard, Pierre-Philippe, An Availabot-like computer-controlled push puppet for Linux, https://web.archive.org/web/20081106161941/http://myspace.voo.be/pcoupard/push_puppet_to_y/, 2008, 7 pgs .

"Detection of ArUco Markers" accessed Jun. 20, 2016, available at the following Web address:http://docs.opencv.org/3.1.0/d5/dae/tutorial_aruco_detection.html#gsc.tab=0, 18 pgs.

Hardware and Software Platform for Mobile Manipulation R&D, 2012, https://web.archive.org/web/20120128031010/http://www.willowgarage.com/pages/pr2/design, 4 pgs.

Heikkila J., et al., "A Four-Step Camera Calibration Procedure with Implicit Image Correction," Computer Vision and Pattern Recognition, 1997, Proceedings, 1997 IEEE Computer Society Conference on, San Juan, 1997, pp. 1106-1112.

Hopkins, Chasing Water with Thermal Imaging, Infrared Training Center, 2011, 14 pgs.

Hunt, et al., "Detection of Changes in Leaf Water Content Using Near-and Middle-Infrared Reflectance, " Journal of Remote Sensing of Environment, 1989, vol. 30 (1), pp. 43-54.

Jain, Learning Trajectory Preferences for Manipulators via Iterative Improvement, 2013, Advances in Neural Information Processing Systems 26 (NIPS 2013), 8 pgs.

Joshi, Blog Post from Perpetual Enigma Website, "Understanding Camera Calibration" posted May 31, 2014, accessed Jun. 20, 2016 at the following Web address: https://prateekvjoshi.com/2014/05/31/understanding-camera-calibration/, 5 pgs.

Kalman Filter; wikipedia, 32 pgs .

Kasabov, "Evolving Spiking Neural Networks for Spatio-and Spectro-Temporal Pattern Recognition", IEEE 6th International Conference Intelligent Systems 2012 [Retrieved on Jun 24, 2014], Retrieved from the Internet: http://ncs.ethz.ch/projects/evospike/publications/evolving- spiking-neural-networks-for-spatio-and-spectro-temporal-pattern-recognition-plenary-talk-ieee-is/view, 6 pgs.

Maesen, et al., "Tile Tracker: A Practical and Inexpensive Positioning System for Mobile AR Applications" pp. 1-8.

PR2 User Manual, Oct. 5, 2012, 40 pgs.

Rahman, et al., "An Image Based Approach to Compute Object Distance," International Journal of Computational Intelligence Systems, 2008, vol. 1 (4), pp. 304-315.

Rosebrock,Tutorial "Find Distance from Camera to Object/marker using Python and OpenCV" Jan. 19, 2015, accessed Jun. 20, 2016 at the following Web address: http://www.pyimagesearch.com/2015/01/19/find-distance-camera-objectmarker-using-python-opencv/, 33 pgs.

Rosenhahn, et al., Pose Estimation in Conformal Geometric Algebra Part I: The Stratification of Mathematical Spaces, Journal of Mathematical Imagine and Vision 22:27-48, 2005.

Steele, The Human Touch Makes Robots Defter, Nov. 6, 2013, Cornell Chronicle. http://www.news.cornell.edu/stories/2013/11/human-touch-makes-robots-defter, 2 pgs.

Thermal Imaging for Moisture and Restoration, retrieved on Apr. 5, 2016 from the following Web address: www.flir.com/home, 4 pgs.

Torralba, et al., "Depth Estimation from Image Structure," Journal of IEEE Transactions on Pattern Analysis and Machine Intelligence, 2002, vol. 24 (9), pp. 1226-1238.

Triggs, "Camera Pose and Calibration from 4 or 5 known 3D Points," 7th International Conference on Computer Vision (ICCV '99), IEEE Computer Society, 1999, vol. 1, pp. 278-284.

Tutorial "Camera Calibration with OpenCV" accessed Jun. 20, 2016 from the following Web address http://docs.opencv.org/2.4/doc/tutorials/calib3d/camera_calibration/camera_calibration.html, 11 pgs.

UNCC Machine Lab Wiki Documentation "ROS and Camera Calibration" accessed Jun. 20, 2016 at the following Web address: http://visionlab.uncc.edu/dokuwiki/ros_and_camera_calibration#aruco_-_augmented_reality_library_from_the_university_of_cordoba, 5 pgs.

Wan, et al., "Automatic Navigation System with Multiple Sensors," IFIP International Federation for Information Processing, vol. 259, Computer and Computing Technologies in Agriculture, 2008, vol. 2, pp. 769-776.

Wikipedia Page "Pose (Computer Vision)" accessed Jun. 20, 2016, available at the following Web address: https://en.wikipedia.org/wiki/Pose_(computer_vision), 2 pgs.

Zhang, A Flexible New Technique for Camera Calibration, last updated 12-5-9, Technical Report MSR-TR-98-71, Dec. 2, 1998, 22 pgs.

* cited by examiner

SYSTEMS AND METHODS FOR DYNAMIC ROUTE PLANNING IN AUTONOMOUS NAVIGATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for dynamic route planning in autonomous navigation.

Background

Robotic navigation can be a complex problem. In some cases, robots can determine a route to travel. By way of illustration, a robot can learn routes demonstrated by a user (e.g., the user can control a robot along a route and/or can upload a map containing a route). As another illustration, a robot can plan its own route in an environment based on its knowledge of the environment (e.g., a map). However, a challenge that can occur is that after a robot determines a route, features of the environment can change. For example, items can fall into the path of the route and/or parts of the environment can change. Current robots may not be able to make real time adjustments to its planned path in response to these changes (e.g., blockages). In such situations, current robots may stop, collide into objects, and/or make suboptimal adjustments to its route. Accordingly, there is a need for improved systems and methods for autonomous navigation, including systems and methods for dynamic route planning.

SUMMARY

The foregoing needs are satisfied by the present disclosure, which provides for, inter alia, apparatus and methods for dynamic route planning in autonomous navigation. Example implementations described herein have innovative features, no single one of which is indispensable or solely responsible for their desirable attributes. Without limiting the scope of the claims, some of the advantageous features will now be summarized.

In a first aspect, a robot is disclosed. In one exemplary implementation, the robot includes: one or more sensors configured to collect data about an environment including detected points on one or more objects in the environment; and a controller configured to: create a map of the environment based at least in part on the collected data, determine a route in the map in which the robot will travel, generate one or more route poses on the route, wherein each route pose comprises a footprint indicative of poses of the robot along the route and each route pose has a plurality of points disposed therein, determine forces on each of the plurality of points of each route pose, the forces comprising repulsive forces from one or more of the detected points on the one or more objects and attractive forces from one or more of the plurality of points on others of the one or more route poses, reposition one or more route poses in response to the forces on each point of the one or more route poses, and perform interpolation between one or more route poses to generate a collision-free path between the one or more route poses for the robot to travel.

In one variant, the one or more route poses form a sequence in which the robot travels along the route; and the interpolation comprises a linear interpolation between sequential ones of the one or more route poses.

In another variant, the interpolation generates one or more interpolation route poses having substantially similar footprints to the footprint of each route pose. In another variant, the determination of the forces on each point of the one or more route poses further comprises computing a force function that associates, at least in part, the forces on each point of each route pose with one or more characteristics of objects in the environment.

In another variant, the one or more characteristics includes one or more of distance, shape, material, and color. In another variant, the force function associates zero repulsive force exerted by a first detected point on a first object where a distance between the first point and a second point of a first route pose is above a predetermined distance threshold.

In another variant, the footprint of each route pose has substantially similar size and shape as the footprint of the robot.

In another variant, the robot comprises a floor cleaner.

In a second aspect, a method for dynamic navigation of a robot is disclosed. In one exemplary implementation, the method includes: generating a map of the environment using data from one or more sensors; determining a route on the map, the route including one or more route poses, each route pose comprising a footprint indicative at least in part of a pose and a shape of the robot along the route and each route pose having a plurality of points disposed therein; computing repulsive forces from a point on an object in the environment onto the plurality of points of a first route pose of the one or more route poses; repositioning the first route pose in response to at least the repulsive force; and performing an interpolation between the repositioned first route pose and another of the one or more route poses.

In one variant, determining attractive forces from a point on another of the one or more route poses exerted on the plurality of points of the first route pose. In another variant, detecting a plurality of objects in the environment with the one or more sensors, each of the plurality of objects having detected points; and defining a force function, the force function computing repulsive forces exerted by each of the detected points of the plurality of objects on the plurality of points of the first route pose, wherein each repulsive force is a vector.

In another variant, repositioning the first route pose includes calculating the minimum of the force function.

In another variant, the repositioning of the first route pose includes translating and rotating the first route pose.

In another variant, interpolation includes: generating an interpolation route pose having a footprint substantially similar to a shape of the robot; and determining a translation and rotation of the interpolation route pose based at least on a collision-free path between the translated and rotated first route pose and the another of the one or more route poses.

In another variant, the method further comprising computing a magnitude of the repulsive forces as proportional to a distance between the point on the object and each of the plurality of points of the first route pose if the point on the object is outside of the footprint of the first route pose.

In another variant, computing a magnitude of the repulsive forces as inversely proportional to a distance between the point on the object and each of the plurality of points of the first route pose if the point on the object is inside the footprint of the first route pose.

In another variant, the method further includes computing torque forces onto the plurality of points of the first route pose due to the repulsive forces.

In a third aspect, a non-transitory computer-readable storage apparatus is disclosed. In one embodiment, the non-transitory computer-readable storage apparatus has a plurality of instructions stored thereon, the instructions being executable by a processing apparatus to operate a robot. The instructions are configured to, when executed by the processing apparatus, cause the processing apparatus to: generate a map of the environment using data from one or more sensors; determine a route on the map, the route including one or more route poses, each route pose comprising a footprint indicative at least in part of a pose and a shape of the robot along the route and each route pose having a plurality of points disposed therein; and compute repulsive forces from a point on an object in the environment onto the plurality of points of a first route pose of the one or more route poses.

In one variant, the instructions when executed by the processing apparatus, further cause the processing apparatus to determine attractive forces from a point on another of the one or more route poses exerted on the plurality of points of the first route pose.

In another variant, the instructions when executed by the processing apparatus, further cause the processing apparatus to determine torque forces from a point on another of the one or more route poses exerted on the plurality of points of the first route pose.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1:
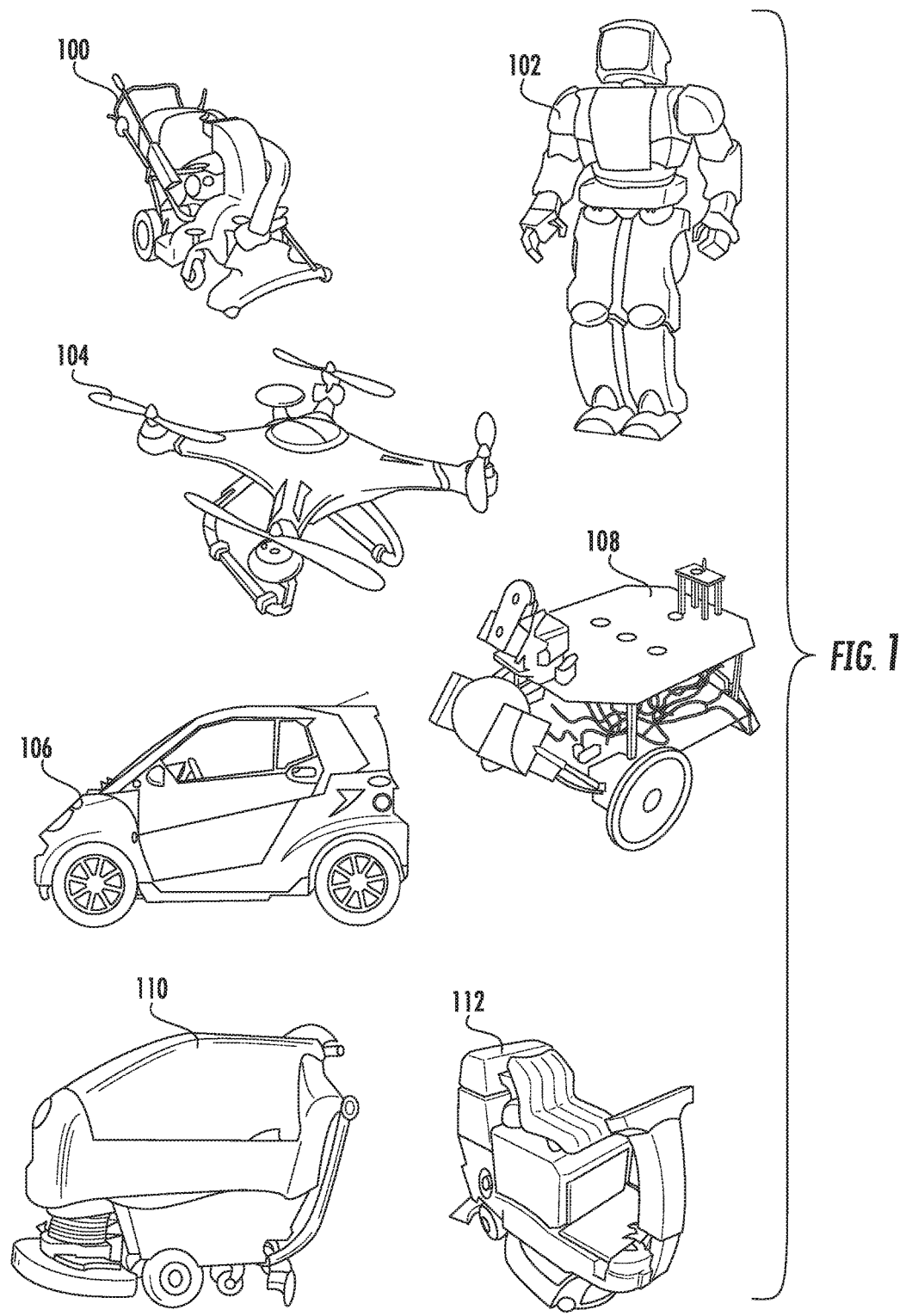
FIG. 1 illustrates various side elevation views of exemplary body forms for a robot in accordance with principles of the present disclosure.

All Figures disclosed herein are © Copyright 2016 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems and methods for dynamic route planning in autonomous navigation. As used herein, a robot can include mechanical or virtual entities configured to carry out complex series of actions automatically. In some cases, robots can be machines that are guided by computer programs or electronic circuitry. In some cases, robots can include electro-mechanical components that are configured for navigation, where the robot can move from one location to another. Such navigating robots can include autonomous cars, floor cleaners, rovers, drones, carts, and the like.

As referred to herein, floor cleaners can include floor cleaners that are manually controlled (e.g., driven or remote control) and/or autonomous (e.g., using little to no user control). For example, floor cleaners can include floor scrubbers that a janitor, custodian, or other person operates and/or robotic floor scrubbers that autonomously navigate and/or clean an environment. Similarly, floor cleaners can also include vacuums, steamers, buffers, mop, polishers, sweepers, burnishers, etc.

Detailed descriptions of the various implementations and variants of the system and methods of the disclosure are now provided. While many examples discussed herein are in the context of robotic floor cleaners, it will be appreciated that the described systems and methods contained herein can be used in other robots. Myriad other example implementations or uses for the technology described herein would be readily envisaged by those having ordinary skill in the art, given the contents of the present disclosure.

Advantageously, the systems and methods of this disclosure at least: (i) provide for dynamic route planning in an autonomously navigating robot; (ii) enhance efficiency in navigating environments, which can allow for improved and/or efficient utilization of resources (e.g., energy, fuel, cleaning fluid, etc.) usage; and (iii) provide computational efficiency which can reduce consumption of processing power, energy, time, and/or other resources in navigating robots. Other advantages are readily discernable by one having ordinary skill given the contents of the present disclosure.

For example, many current robots that can autonomously navigate are programmed to navigate a route and/or path to a goal. In order to navigate these routes, these robots can create a path plan (e.g., a global solution). Also, these robots can have localized plans in a small area around it (e.g., in the order of a few meters), where the robot can determine how it will navigate around obstacles detected by its sensors (typically with basic commands to turn when an object is detected). The robot can then traverse the space in the pattern and avoid obstacles detected by its sensors by, e.g., stopping, slowing down, deviating left or right, etc. However, in many current applications, such traversal and avoidance can be complicated and robots can either have undesirable results (e.g., stoppages or collisions) and/or not be able to navigate through more complex situations. In some cases, such current applications can also be computationally expensive and/or slow to run, causing robots to act unnaturally.

Advantageously, using systems and methods disclosed herein, robots can deviate from its programming, following more efficient paths and/or making more complex adjustments to avoid obstacles. In some implementations described herein, such movements can be determined in a more efficient, faster way, that also appears more natural as a robot plans more complex paths.

A person having ordinary skill in the art would appreciate that a robot, as referred to herein, can have a number of different appearances/forms. FIG. 1 illustrates various side elevation views of exemplary body forms for a robot in accordance with principles of the present disclosure. These are non-limiting examples meant to further illustrate the variety of body forms, but not to restrict robots described herein to any particular body form. For example, body form 100 illustrates an example where the robot is a stand-up shop vacuum. Body form 102 illustrates an example where the robot is a humanoid robot having an appearance substantially similar to a human body. Body form 104 illustrates an example where the robot is a drone having propellers. Body form 106 illustrates an example where the robot has a vehicle shape having wheels and a passenger cabin. Body form 108 illustrates an example where the robot is a rover.

Body form 110 can be an example where the robot is a motorized floor scrubber. Body form 112 can be a motorized floor scrubber having a seat, pedals, and a steering wheel, where a user can drive body form 112 like a vehicle as body form 112 cleans, however, body form 112 can also operate autonomously. Other body forms are further contemplated, including industrial machines that can be robotized, such as forklifts, tugs, boats, planes, etc.

Figure 2A:
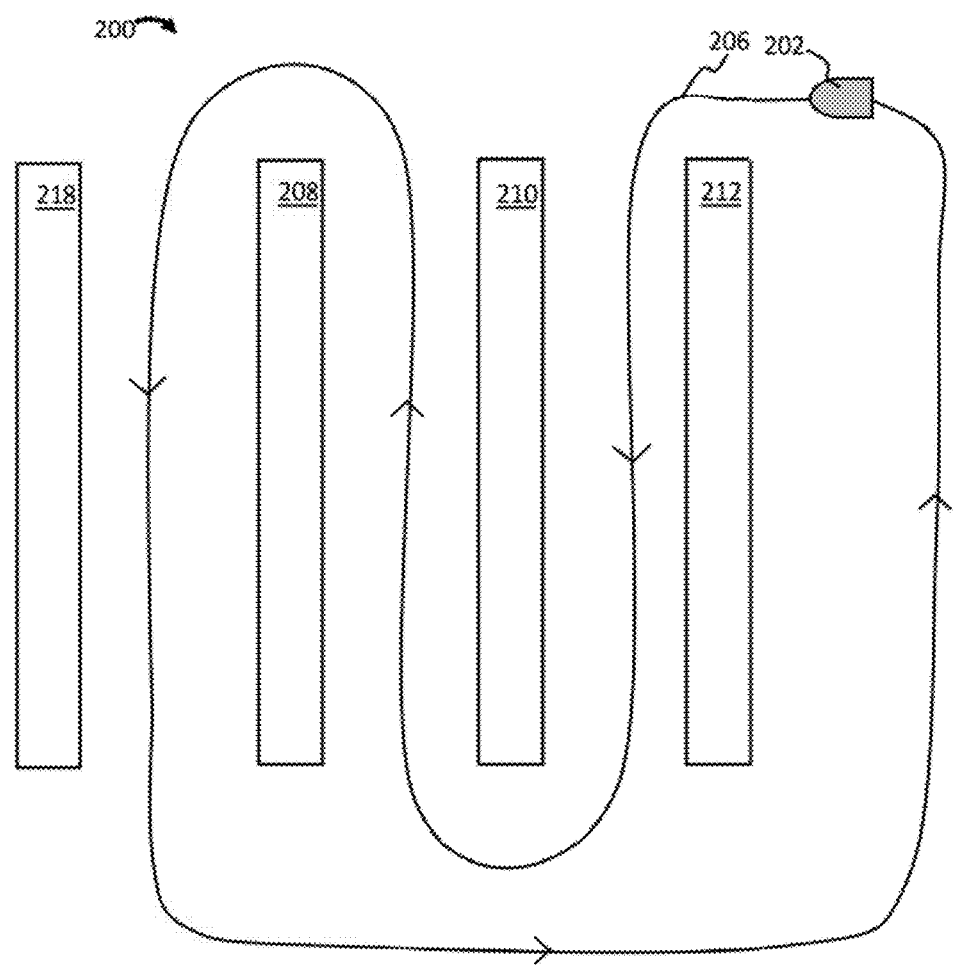
FIG. 2A is a diagram of an overhead view of a robot navigating a path in accordance with some implementations of this disclosure.

FIG. 2A is a diagram of an overhead view of robot 202 navigating a path 206 in accordance with some implementations of this disclosure. Robot 202 can autonomously navigate through environment 200, which can comprise various objects 208, 210, 212, 218. Robot 202 can start at an initial location and end at an end location. As illustrated, the initial position and the end position are substantially the same, illustrating a substantially closed loop. However, in other cases, the initial location and the end location may not be substantially the same, forming an open loop.

By way of illustration, in some implementations, robot 202 can be a robotic floor cleaner, such as a robotic floor scrubber, vacuum cleaner, steamer, mop, burnisher, sweeper, and the like. Environment 200 can be a space having floors that are desired to be cleaned. For example, environment 200 can be a store, warehouse, office building, home, storage facility, etc. One or more of objects 208, 210, 212, 218 can be shelves, displays, objects, items, people, animals, or any other entity or thing that may be on the floor or otherwise impede the robot's ability to navigate through environment 200. Route 206 can be the cleaning path traveled by robot 202 autonomously. Route 206 can follow a path that weaves between objects 208, 210, 212, 218 as illustrated in example route 206. For example, where objects 208, 210, 212, 218 are shelves in a store, robot 202 can go along the aisles of the store and clean the floors of the aisles. However, other routes are also contemplated, such as, without limitation, weaving back and forth along open floor areas and/or any cleaning path a user could use to clean the floor (e.g., if the user is manually operating a floor cleaner). In some cases, robot 202 can go over a portion a plurality of times. Accordingly, routes can overlap on themselves. Accordingly, route 206 is meant merely as illustrative examples and can appear differently as illustrated. Also, as illustrated, one example of environment 200 is shown, however, it should be appreciated that environment 200 can take on any number of forms and arrangements (e.g., of any size, configuration, and layout of a room or building) and is not limited by the example illustrations of this disclosure.

In route 206, robot 202 can begin at the initial location, which can be robot 202's starting point. Robot 202 can then clean along route 206 autonomously (e.g., with little or no control from a user) until it reaches an end location, where it can stop cleaning. The end location can be designated by a user and/or determined by robot 202. In some cases, the end location can be the location in route 206 after which robot 202 has cleaned the desired area of floor. As previously described, route 206 can be a closed loop or an open loop. By way of illustrative example, an end location can be a location for storage for robot 202, such as a temporary parking spot, storage room/closet, and the like. In some cases, the end location can be the point where a user training and/or programming tasks for robot 202 stopped training and/or programming.

In the context of floor cleaners (e.g., floor scrubbers, vacuum cleaners, etc.), robot 202 may or may not clean at every point along route 206. By way of illustration, where robot 202 is a robotic floor scrubber, the cleaning system (e.g., water flow, cleaning brushes, etc.) of robot 202 may only be operating in some portions of route 206 and not others. For example, robot 202 may associate certain actions (e.g., turning, turning on/off water, spraying water, turning on/off vacuums, moving vacuum hose positions, gesticulating an arm, raising/lowering a lift, moving a sensor, turning on/off a sensor, etc.) with particular positions and/or trajectories (e.g., while moving in a certain direction or in a particular sequence along route 206) along the demonstrated route. In the context of floor cleaners, such association may be desirable when only some areas of the floor are to be cleaned but not others and/or in some trajectories. In such cases, robot 202 can turn on a cleaning system in areas where a user demonstrated for robot 202 to clean, and turn off the cleaning system otherwise.

Figure 2B:
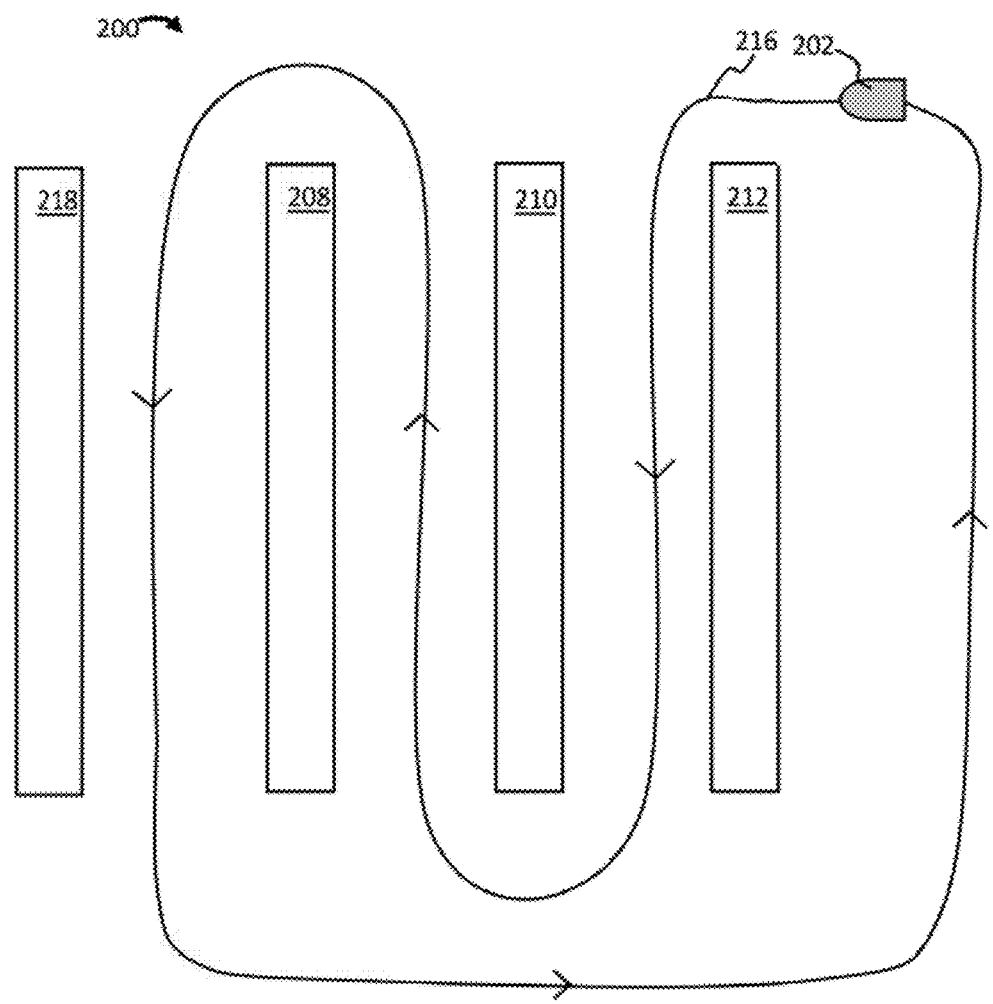
FIG. 2B illustrates an overhead view of a user demonstrating a route to a robot before the robot autonomously travels a route in an environment.

FIG. 2B illustrates an overhead view of a user demonstrating route 216 to robot 202 before robot 202 autonomously travels route 206 in environment 200. In demonstrating route 216, a user can start robot 202 at an initial location. Robot 202 can then weave around objects 208, 210, 212, 218. Robot 202 can stop at an end location, as previously described. In some cases (and as illustrated), autonomously navigated route 206 can be exactly the same as demonstrated route 216. In some cases, route 206 might not be precisely the same as route 216, but can be substantially similar. For example, as robot 202 navigates route 206, robot 202 uses its sensors to sense where it is in relationship to its surrounding. Such sensing may be imprecise in some instances, which may cause robot 202 to not navigate the precise route that had been demonstrated and robot 202 had been trained to follow. In some cases, small changes to environment 200, such as the moving of shelves and/or changes in the items on the shelves, can cause robot 202 to deviate from route 216 when it autonomously navigates route 206. As another example, as previously described, robot 202 can avoid objects by turning around them, slowing down, etc. when autonomously navigating route 206. These objects might not have been present (and avoided) when the user demonstrated route 216. For example, the objects may be temporarily and/or transient items, and/or may be transient and/or dynamic changes to the environment 200. As another example, the user may have done a poor job demonstrating route 216. For example, the user may have crashed and/or bumped into a wall, shelf, object, obstacle, etc. As another example, an obstacle may have been present while the user had demonstrated route 216, but no longer there when robot 202 autonomously navigates route 206. In these cases, robot 202 can store in memory (e.g., memory 302) one or more actions that it can correct, such as crashing and/or bumping to a wall, shelf, object, obstacle, etc. When robot 202 then autonomously navigates demonstrated route 216 (e.g., as route 206), robot 202 can correct such actions and not perform them (e.g., not crash and/or bump into a wall, shelf, object, obstacle, etc.) when it is autonomously navigating. In this way, robot 202 can determine not to autonomously navigate at least a portion of a navigable route, such as a demonstrated route. In some implementations, determining not to autonomously navigate at least a portion of the navigable route includes determining when to avoid an obstacle and/or object.

As previously mentioned, as a user demonstrates route 216, the user can turn on and off the cleaning system of robot 202, or perform other actions, in order to train robot 202 where (e.g., at what position), and/or along what trajectories, to clean along route 216 (and subsequently when robot 202 autonomously cleans route 206). The robot can record these actions in memory 302 and later perform them when autonomously navigating. These actions can include any actions that robot 202 may perform, such as turning, turning on/off water, spraying water, turning on/off vacuums, moving vacuum hose positions, gesticulating an arm, raising/lowering a lift, moving a sensor, turning on/off a sensor, etc.

Figure 3:
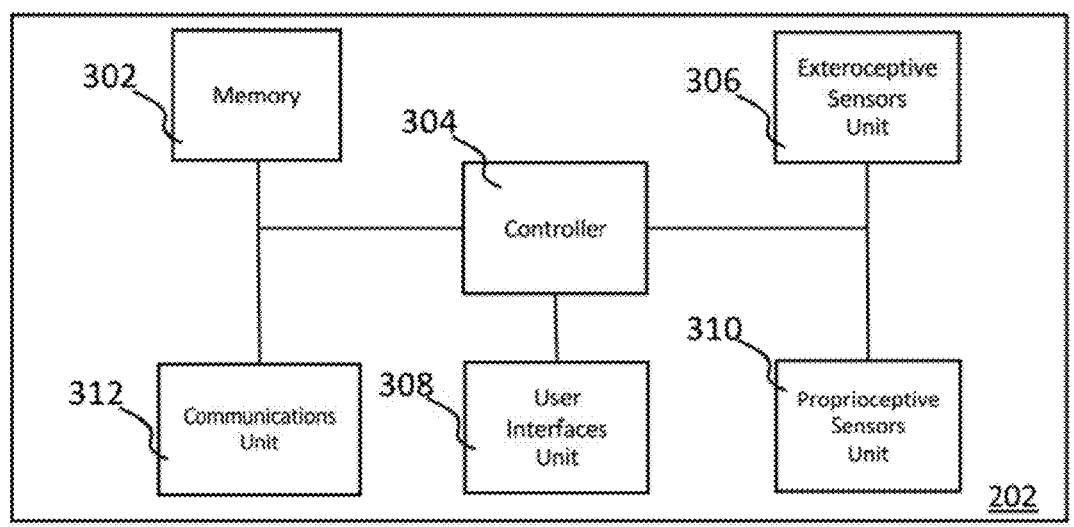
FIG. 3 is a functional block diagram of a robot in accordance with some principles of this disclosure.

FIG. 3 is a functional block diagram of a robot 202 in accordance with some principles of this disclosure. As illustrated in FIG. 3, robot 202 can include controller 304, memory 302, user interfaces unit 308, exteroceptive sensors unit 306, proprioceptive sensors unit 310, and communications unit 312, as well as other components and subcomponents (e.g., some of which may not be illustrated). Although a specific implementation is illustrated in FIG. 3, it is appreciated that the architecture may be varied in certain implementations as would be readily apparent to one of ordinary skill given the contents of the present disclosure.

Controller 304 can control the various operations performed by robot 202. Controller 304 can include one or more processors (e.g., microprocessors) and other peripherals. As used herein, processor, microprocessor, and/or digital processor can include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 304 can be operatively and/or communicatively coupled to memory 302. Memory 302 can include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), "flash" memory (e.g., NAND/NOR), memristor memory, pseudostatic RAM ("PSRAM"), etc. Memory 302 can provide instructions and data to controller 304. For example, memory 302 can be a non-transitory, computer-readable storage medium having a plurality of instructions stored thereon, the instructions being executable by a processing apparatus (e.g., controller 304) to operate robot 202. In some cases, the instructions can be configured to, when executed by the processing apparatus, cause the processing apparatus to perform the various methods, features, and/or functionality described in this disclosure. Accordingly, controller 304 can perform logical and arithmetic operations based on program instructions stored within memory 302.

In some implementations, exteroceptive sensors unit 306 can comprise systems and/or methods that can detect characteristics within and/or around robot 202. Exteroceptive sensors unit 306 can comprise a plurality and/or a combination of sensors. Exteroceptive sensors unit 306 can include sensors that are internal to robot 202 or external, and/or have components that are partially internal and/or partially external. In some cases, exteroceptive sensors unit 306 can include exteroceptive sensors such as sonar, LIDAR, radar, lasers, cameras (including video cameras, infrared cameras, 3D cameras, etc.), time of flight ("TOF") cameras, antenna, microphones, and/or any other sensor known in the art. In some implementations, exteroceptive sensors unit 306 can collect raw measurements (e.g., currents, voltages, resistances gate logic, etc.) and/or transformed measurements (e.g., distances, angles, detected points in obstacles, etc.). Exteroceptive sensors unit 306 can generate data based at least in part on measurements. Such data can be stored in data structures, such as matrices, arrays, etc. In some implementations, the data structure of the sensor data can be called an image.

In some implementations, proprioceptive sensors unit 310 can include sensors that can measure internal characteristics of robot 202. For example, proprioceptive sensors unit 310 can measure temperature, power levels, statuses, and/or any other characteristic of robot 202. In some cases, proprioceptive sensors unit 310 can be configured to determine the odometry of robot 202. For example, proprioceptive sensors unit 310 can include proprioceptive sensors unit 310, which can comprise sensors such as accelerometers, inertial measurement units ("IMU"), odometers, gyroscopes, speedometers, cameras (e.g. using visual odometry), clock/timer, and the like. Odometry to facilitate autonomous navigation of robot 202. This odometry can include robot 202's position (e.g., where position includes robot's location, displacement and/or orientation, and can sometimes be interchangeable with the term pose as used herein) relative to the initial location. In some implementations, proprioceptive sensors unit 310 can collect raw measurements (e.g., currents, voltages, resistances gate logic, etc.) and/or transformed measurements (e.g., distances, angles, detected points in obstacles, etc.). Such data can be stored in data structures, such as matrices, arrays, etc. In some implementations, the data structure of the sensor data can be called an image.

In some implementations, user interfaces unit 308 can be configured to enable a user to interact with robot 202. For example, user interfaces 308 can include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. User interfaces unit 308 can include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. In some implementations user interfaces unit 308 can be positioned on the body of robot 202. In some implementations, user interfaces unit 308 can be positioned away from the body of robot 202, but can be communicatively coupled to robot 202 (e.g., via communication units including transmitters, receivers, and/or transceivers) directly or indirectly (e.g., through a network, server, and/or a cloud).

In some implementations, communications unit 312 can include one or more receivers, transmitters, and/or transceivers. Communications unit 312 can be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi can include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Communications unit 312 can also be configured to send/receive a transmission protocol over wired connections, such as any cable that has a signal line and ground. For example, such cables can include Ethernet cables, coaxial cables, Universal Serial Bus ("USB"), FireWire, and/or any connection known in the art. Such protocols can be used by communications unit 312 to communicate to external systems, such as computers, smart phones, tablets, data capture systems, mobile telecommunications networks, clouds, servers, or the like. Communications unit 312 can be configured to send and receive signals comprising of numbers, letters, alphanumeric characters, and/or symbols. In some cases, signals can be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 312 can be configured to send and receive statuses, commands, and other data/information. For example, communications unit 312 can communicate with a user operator to allow the user to control robot 202. Communications unit 312 can communicate with a server/network in order to allow robot 202 to send data, statuses, commands, and other communications to the server. The server can also be communicatively coupled to computer(s) and/or device(s) that can be used to monitor and/or control robot 202 remotely. Communications unit 312 can also receive updates (e.g., firmware or data updates), data, statuses, commands, and other communications from a server for robot 202.

In some implementations, one or the components and/or subcomponents can be instantiated remotely from robot 202. For example, mapping and localization units 262, may be located in a cloud and/or connected to robot 202 through communications unit 312. Connections can be direct and/or through a server and/or network. Accordingly, implementations of the functionality of this disclosure should also be understood to include remote interactions where data can be transferred using communications unit 312, and one or more portions of processes can be completed remotely.

Figure 4A:
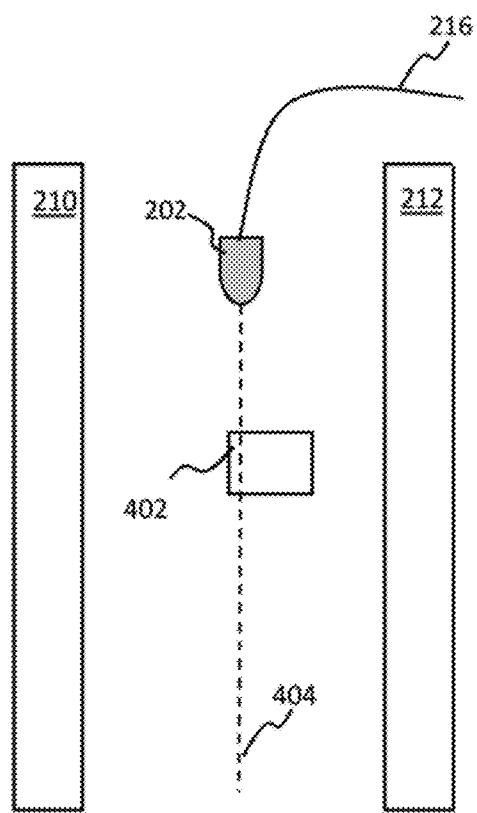
FIG. 4A is a top view diagram illustrating the interaction between a robot and an obstacle in accordance with some implementations of this disclosure.

FIG. 4A is a top view diagram illustrating the interaction between robot 202 and an obstacle 402 in accordance with some implementations of this disclosure. In navigating route 216, robot 202 can encounter obstacle 402. Obstacle 402 can impede the path of robot 202, which is illustrated as route portion 404. If robot were to continue following on route portion 404, it may collide with obstacle 402. However, in some circumstances, using exteroceptive sensors unit 306 and/or proprioceptive sensors unit 310, robot 202 can stop before colliding with obstacle 402.

Figure 4B:
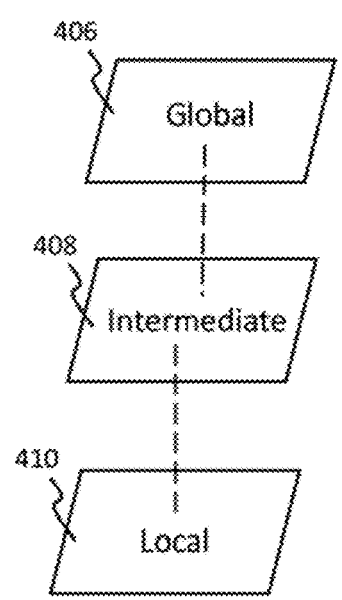
FIG. 4B is a diagram of a global layer, intermediate layer, and local layer in accordance with implementations of the present disclosure.

This interaction with obstacle 402 illustrates advantages of implementations in accordance with the present disclosure. FIG. 4B is a diagram of global layer 406, intermediate layer 408, and local layer 410 in accordance with implementations of the present disclosure. Global layer 406, intermediate layer 408, and local layer 410 can be hardware and/or software layers instantiated in one or more of memory 302 and/or controller 304. Global layer 406 can include software and/or hardware that implements global mapping and routing. For example, the high-level mapping can include a map of environment 200. The map can also include a representation of route 216, allowing robot 202 to navigate the space in environment 200.

In some implementations, global layer 406 can include a global planner. In this way, global layer 406 can determine one or more of: the location of robot 202 (e.g., in global coordinates such as two-dimensional coordinates, three-dimensional coordinates, four-dimensional coordinates, etc.); the path robot 202 should take to reach its goal; and/or higher-level (e.g., long-range) planning. In this way, robot 202 can determine its general path and/or direction to travel from one location to another.

Local layer 410 includes software and/or hardware that implements local planning. For example, local layer 410 can include short-range planning configured for maneuvering in local constraints of motion. Local layer 410 can process data received from exteroceptive sensors unit 306 and determine the presence and/or positioning of obstacles and/or objects near robot 202. For example, if an object is within range of a sensor of exteroceptive sensors unit 306 (e.g., a LIDAR, sonar, camera, etc.), robot 202 can detect the object. The local layer 410 can compute and/or control motor functionality to navigate around objects, such by controlling actuators to turn, move forward, reverse, etc. In some cases, processing in local layer 410 can be computationally intensive. For example, local layer 410 can receive data from sensors of exteroceptive sensors unit 306 and/or proprioceptive sensors unit 310. Local layer 410 can then determine motor functions to avoid an object detected by exteroceptive sensors unit 306 (e.g., using a motor to turn a steering column left and right, and/or using a motor to push the robot forward). The interplay of local layer 410 and global layer 406 can allow robot 202 to make local adjustments while still moving generally along a route to its goal.

However, in some circumstances, it can be desirable to make adjustments at a finer level than what would be computed by global layer 406, yet not at the computationally intensive level of precise motor functions of local layer 410. Accordingly, intermediate layer 408 can include hardware and/or software that can determine intermediate adjustments of robot 202 as it navigates around objects.

In intermediate layer 408, robot 202 can plan how to avoid objects and/or obstacles in its environment. In some cases, intermediate layer 408 can be initialized with at least a partial path and/or route from a global path planner from global layer 406.

Because objects (e.g., obstacles, walls, etc.) present things in which robot 202 could collide, objects and/or obstacles can put forth a repulsive force on robot 202. In some cases, by objects repulsing robot 202, robot 202 can navigate along a collision-free path around those objects and/or obstacles.

Figure 4C:
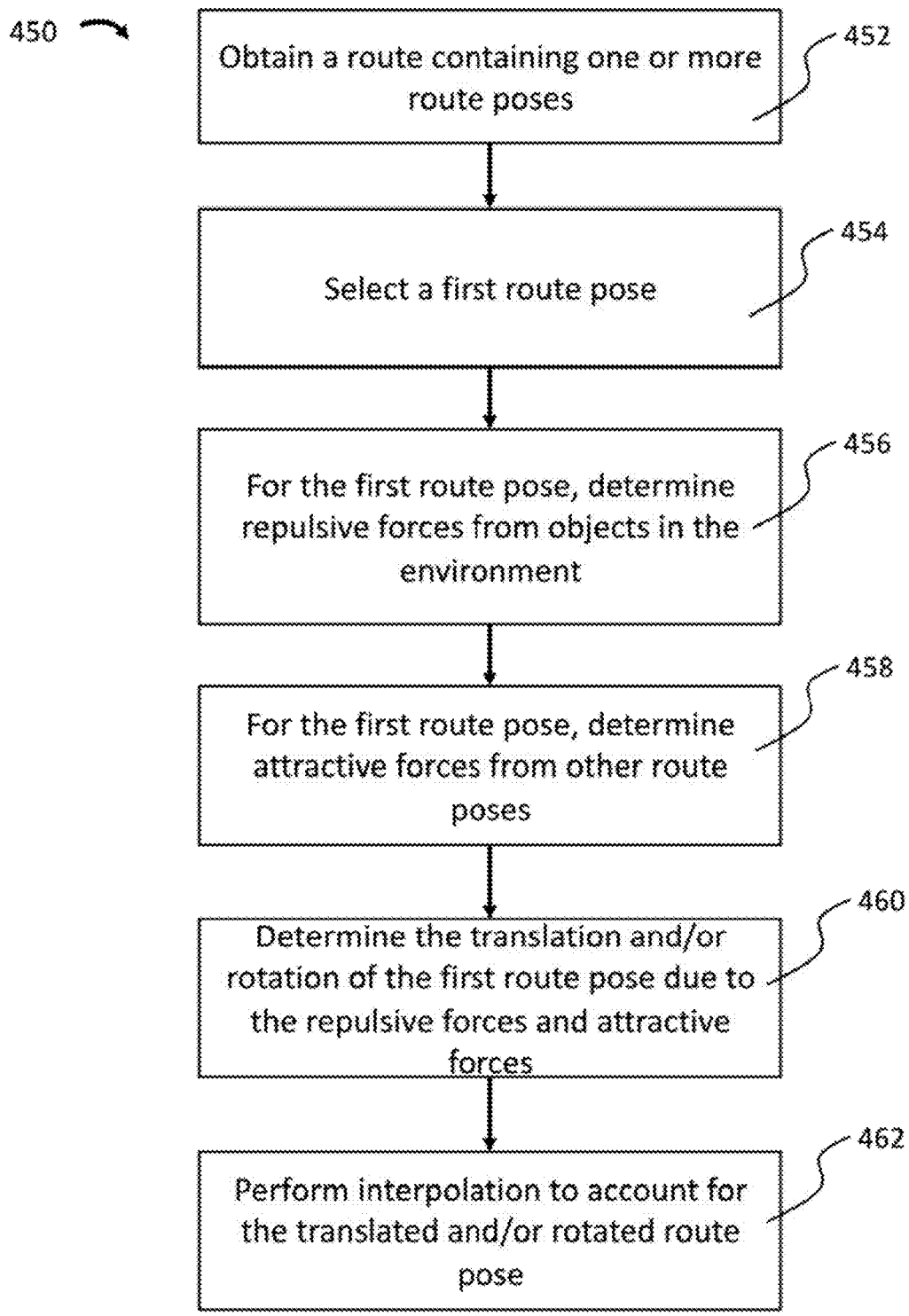
FIG. 4C is a process flow diagram of an exemplary method for dynamic route planning in accordance with some implementations of this disclosure.

FIG. 4C is a process flow diagram of an exemplary method 450 for dynamic route planning in accordance with some implementations of this disclosure. In some implementations, method 450 can be performed by intermediate layer 408 and/or by controller 304. Block 452 can include obtaining a route containing one or more route poses. In some cases, this route can be created by robot 202 and/or uploaded onto robot 202. In some cases, the route can be passed from global layer 406 to intermediate layer 408. Block 454 can include selecting a first route pose. Block 456 can include, for the first route pose, determining repulsive forces from objects in the environment. Block 458 can include, for the first route pose, determining attractive forces from other route poses. Block 460 can include determining the translation and/or rotation of the first route pose due to the repulsive forces and attractive forces. Block 462 can include performing interpolation to account for the translated and/or rotated route pose. This process and others will be illustrated throughout this disclosure.

Figure 4D:
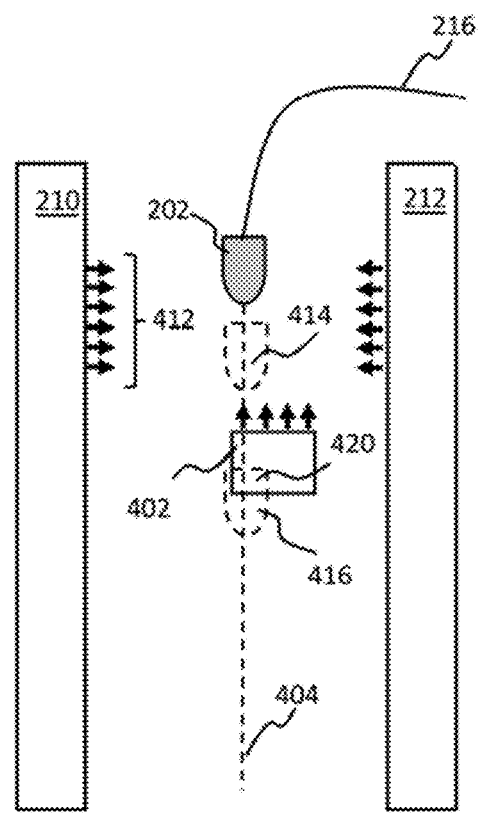
FIG. 4D illustrates an overhead view of route poses along with repulsive forces exerted by objects in accordance with some implementations of the present disclosure.

By way of illustration, FIG. 4D illustrates route poses 414 and 416 along with repulsive forces exerted by objects in accordance with some implementations of the present disclosure. For example, the points on a route can be discretized locations along the path, such as route poses, illustrating the pose of robot 202 throughout its route. In some cases, such discretized locations can also have associated probabilities, such as particles or bubbles. Route poses can identify the position and/or orientation that robot 202 would travel on the route. In a planar application, the route pose can include (x, y, θ) coordinates. In some cases, θ can be the heading of the robot in the plane. The route poses can be regularly or irregularly spaced on robot 202's route. In some cases, intermediate layer can obtain the route containing one or more route poses from global layer 406, as described in block 452 of method 450. In some implementations, route poses can form a sequence, wherein robot 202 travels between sequential route poses on a route. For example, route poses 414 and 416 could be a sequence of route poses where robot 202 travels to route pose 414 and then to route pose 416.

By way of illustrative example, route poses 414 and 416 illustrate discretized locations along the route portion 404. This illustrative example shows route poses 414 and 416 as shaped as robot 202, with substantially similar footprints. The footprints of route poses 414 and 416 can be adjusted in size depending on how conservative one desires to be with respect to robot collisions. A smaller footprint can present higher likelihoods of a collision, but such a smaller footprint can allow robot 202 to clear more areas that it should be able to as it autonomously navigates. A larger footprint might decrease the likelihood of a collision, but robot 202 would not go through some places autonomously that it otherwise should be able to. The footprint can be predetermined by a footprint parameter that sets the size (e.g., scales) of the footprint of robot 202, as illustrated in route poses (e.g., route poses 414 and 416). In some cases, there can be a plurality of footprint parameters that control the sizes of route poses of robot 202 asymmetrically.

In FIG. 4D, while route poses 414 and 416 are illustrated and described, it should be appreciated by someone having ordinary skill in the art that there can be any number of route poses throughout a route, and the descriptions of the implementations of this disclosure can be applied to those route poses. Advantageously, having route poses 414 and 416 shaped like robot 202 (e.g., a footprint of robot 202) can allow robot 202 to determine places in which robot 202 can fit while travelling. The footprint parameter(s) can be used to adjust how robot 202 projects itself. For example, a larger footprint used in route poses 414 and/or 416 can be more conservative in that it can cause, at least in part, robot 202 to travel further away from objects. In contrast, a smaller footprint can cause, at least in part, robot 202 to travel closer to objects. Route poses (e.g., route poses 414 and 416) can be of different sizes from one another. By way of illustration, it may be desirable for robot 202 to be more conservative in certain scenarios, such as on turns. Accordingly, in this illustration, the footprint of route poses on turns can be larger than the footprint of route poses on straightaways. Such dynamic reshaping of route poses can be performed by making the size of the route poses dependent on the rotation of the route pose relative to other route poses, or the changes in translation and/or rotation of route pose. One or more of the route poses on a route (e.g., route poses 414 and/or 416) can also be a different shape other than the shape of robot 202. For example, the route poses can be circular, square, triangular, and/or any other shape.

As described in block 454 from method 450, one can observe either route poses 414 or 416 as a first route pose. However, for purposes of illustration, and to illustrate the breadth of the described implementations of this disclosure, route poses 414 and 416 will be described together.

Points along objects (e.g., points determined by mapping, detecting by sensors of exteroceptive sensors unit 306, etc.) can exert a repulsive force on route poses of robot 202 (e.g., route poses 414 and 416). In this way, the objects can, conceptually, prevent robot 202 from colliding into them. In some cases, these points can represent at least in part poses and/or sets of poses. For example, arrows 412 illustrate repulsive forces from points along object 210.

In some implementations, the forces exerted by points by objects may be uniform in that each point on route poses 414 and 416 can have substantially similar forces exerted on them. However, in other implementations, the forces exerted by points of objects on route poses 414 and 416 may not be uniform and may vary based on a force function.

By way of illustration, a force function (e.g., a repulsive force function) can in some cases determine at least in part the repulsive force exerted on a point on route poses 414 or 416 by an object. For example, the force functions can be used in block 456 of method 450 to determine the repulsive forces from objects in the environment for a first route pose (e.g., a first route pose of route poses 414 and 416). In some implementations, the force function can be dependent on characteristics of where an object appears relative to route poses 414 and 416. The force function can then represent the force experienced by points route poses 414 and 416 (e.g., one or more points on the surface of route poses 414 and 416, the center of route poses 414 and 416, the center of mass of route poses 414 and 416, and/or any point of and/or around route poses 414 and 416). Because the forces can be dependent on their direction and magnitudes, repulsive forces (and/or attractive forces) can be vectors. In some cases, repulsive forces can exert rotational forces on a route pose, which can manifest in torque forces.

For example, repulsion forces and torque forces can be calculated at n different poses along a path. In some cases, these n different poses can be associated with route poses. Each pose can consist of m points in a footprint. In some cases, these m points can be points on the route poses.

Figure 4E:
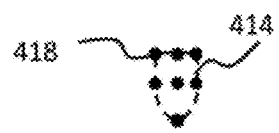
FIG. 4E illustrates example points on a route pose in accordance with some implementations of the present disclosure.

In some cases, a plurality of points can define the body of robot 202 as reflected in route poses 414 and 416, providing representative coverage over a portion of the body of robot 202 and/or substantially all of robot 202. For example, 15-20 points can be distributed throughout the surface and/or interior of robot 202 and be reflected in route poses 414 and 416. However, in some cases, there can be fewer points. FIG. 4E illustrates example points on route pose 414, such as point 418. Each point can experience, at least in part, the forces (e.g., repulsive forces) placed on it by objects in the surrounding of route poses 414.

Advantageously, by having a plurality of points on the body of route poses 414 and 416 that can experience forces, points of route poses 414 and 416 can translate and/or rotate relative to one another, causing, at least in part, repositioning (e.g., translation and/or rotation) of route poses 414 and 416. These translations and/or rotations of route poses 414 and 416 can cause deformations of the route navigated by robot 202.

Torsion forces can occur when different points on a route pose experience different magnitudes and directions of forces. Accordingly, the torsion force can cause the route poses to rotate. In some cases, predetermined parameters can define at least in part the torsion experienced by route poses 414 and 416. For example, a predetermined torsion parameter can include a multiplier for the rotational forces experience on a point on route poses 414 or 416. This predetermined torsion parameter can be indicative of force due to misalignment of route poses 414 or 416 and the path. In some cases, the predetermined torsion parameter may vary based on whether the force is repulsive or cohesive.

Returning to FIG. 4D, a characteristic on which the force function depends in part can be a position of a point on an object relative to route poses 414 and 416. Distance can be determined based at least in part on sensors of exteroceptive sensors unit 306. As a first example, the repulsive force exerted onto route poses 414 and 416 from a point on an object exterior to robot 202 (e.g., not within the footprint of route poses 414 and 416 such as points on obstacles 210 and 212 as illustrated) can be characterized at least in part by the function $r(d) \propto 1/d$, where r is the repulsion of a point on an object and d is the distance between the point on an object and a point on route pose 414 or route pose 416. In this way, the repulsion of a point on an object is inversely proportional to the distance between the point on the object and the point on route pose 414 or route pose 416. Advantageously, such a function allows objects close to route poses 414 and 416 to exert more repulsion, and thereby potentially more strongly influence the course of robot 202 to avoid a collision than objects further away.

In some cases, a predetermined repulsive distance threshold can be put on the distance between a point on route pose 414 and route pose 416 and a point on an object. This predetermined repulsive distance threshold can be indicative at least in part of the maximum distance between a points on either route pose 414 and route pose 416 and a point on an object in which the point on the object can exert a repulsive force (and/or a torsion force) on points on either route poses 414 and 416. Accordingly, when a point on an object is a distance (e.g., from a point on either route pose 414 and route pose 416) that is above (or equal to and/or above, depending on the definition of the threshold), the repulsive force and/or torsion force can be zero or substantially zero. Advantageously, having a predetermined repulsive distance threshold can, in some cases, prevent some points on objects from exerting forces on points on route poses 414 and 416. In this way, when there is a predetermined repulsive distance, robot 202 can get closer to certain objects and/or not be influenced by further away objects.

As a second example, the repulsive force exerted onto route poses 414 and 416 from a point on the interior of route poses 414 and 416 (e.g., within the footprint of route poses 414 and 416). For example, object 402 has portion 420 that appears interior to route pose 416. In these cases, a different force function can be exerted by points of object 402 in portion 420 onto points of route pose 416 in portion 420. In some implementations, this force can be characterized at least in part by the function $r(d) \propto d$, where the variables are as described above. Advantageously, by having a different force function defined for interior objects, route pose 416 can move asymmetrically causing rotations.

In some implementations, the force function can also depend on other characteristics of objects, such as shape, material, color, and/or any other characteristic of the object. These characteristics can be determined by one or more of sensors of exteroceptive sensors 306 in accordance with known methods in the art. Advantageously, taking into account characteristics can be further informative of how robot 202 should navigate around objects. In some instances, the cost map can be used to compute additional repulsion values based on these characteristics.

For example, the shape of an object can be indicative at least in part of an associated repercussion of collision. By way of illustration, a humanoid shape may be indicative of a person. As such, an object detected with this shape can place a greater repulsive force on route poses 414 and 416 in order to push the path further away from the humanoid shape. As another example, the shape of an object can be indicative in part of increased damage (e.g., to the object or robot 202) if a collision occurred. By way of illustration, pointed objects, skinny objects, irregular objects, predetermined shapes (e.g., vase, lamp, display, etc.) and/or any other shape can be indicative at least in part of resulting in increased damage. Size may be another characteristic of shape that can be taken into account. For example, smaller objects may be more fragile in the event of a collision, but larger objects could cause more damage to robot 202. In the case of size, force functions can take into account the size of the objects so that the points on those objects repulse points on route poses 414 and 416 proportionally as desired. By way of illustration, if route pose 414 is between a larger object and a smaller object, if points of the larger object have a relatively larger repulsive force as defined at least in part on the force function, route pose 414 will be pushed relatively closer to the smaller object. If the points of the smaller object have a relatively larger repulsive force as defined at least in part on the force function, route pose 414 will be pushed relatively closer to the larger object. Accordingly, the repulsive force on route poses 414 and 416 can be adjusted based at least in part on the shape. The shape can be detected at least in part by sensors of exteroceptive sensors unit 306. As another illustrative example, walls can be identified in a cost map, and a repulsive force can be associated with walls due to their size and shape.

In some implementations, the force function can also depend on the material of the objects. For example, certain materials can be indicative at least in part of more damage if a collision occurred. By way of illustration, glass, porcelain, mirrors, and/or other fragile material can prove to be more damaging in the event of a collision. In some cases, such as in the case of mirrors, the material can sometimes cause errors in the sensors of exteroceptive sensor units 306. Accordingly, in some cases, it may be desirable for robot 202 to navigate further away from such objects, which can be reflected in the force function (e.g., increasing the repulsion force exerted by points on objects of some materials versus other materials).

In some implementations, color can be detected by sensors of exteroceptive sensor units 306. The force function can be dependent at least in part on the color of an object and/or points on an object. For example, certain objects in an environment may be a certain color (e.g., red, yellow, etc.) to indicate at least in part that robot 202 (or in some cases people) should be cautious of those objects. Accordingly, in some cases, it may be desirable for robot 202 to navigate further away from such objects, which can be reflected in the force function.

In some implementations, the force function can be dependent on other factors, such as the location of an object. For example, certain areas of a map (e.g., as passed from global layer 406) can have characteristics. By way of illustration, some areas of the map (e.g., a cost map) can be areas in which robot 202 should not pass. There can also can be places where robot 202 cannot go into because they are not accessible (such as into an object). Accordingly, in some cases, the force function can be adjusted to account for such places. In some implementations, the force function can cause points in those places to exert no force (or substantially no force) on points on route poses 414 and 416. Advantageously, no force can be reflective of regions where robot 202 would not go (e.g., inside objects and the like). In contrast, in some implementations, such places can be treated as obstacles, exerting a repulsive force on route poses 414 and 416. Advantageously, having such a repulsion force can keep robot 202 from attempting to enter such areas.

Figure 4F:
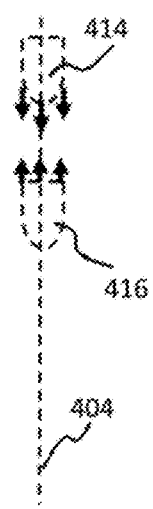
FIG. 4F illustrates an overhead view showing attractive forces between route poses in accordance with some implementations of the present disclosure.

In some implementations, not all forces on route poses 414 and 416 are repulsive. For example, points on route poses (e.g., route poses 414 and 416) can exert attractive (e.g., cohesive) forces, which can, at least in part, pull route poses towards each other. FIG. 4F illustrates attractive forces between route poses 414 and 416 in accordance with some implementations of the present disclosure. The arrows are indicative at least in part that route poses are drawn towards each other along route portion 404. Advantageously, the cohesive force between route poses can cause, at least in part, robot 202 towards following a path substantially similar to the path planned by global layer 406 (e.g., a route substantially similar to an original route, such as an originally demonstrated route that robot 202 should follow in the absence of objects around which to navigate).

The cohesive force can be set by a force function (e.g., a cohesive force function), which can be dependent on characteristics of the path, such as the spacing distance between route poses/particles, the smoothness of the path, how desirable it is for robot 202 to follow a path, etc. In some cases, the cohesive force function can be based at least in part on a predetermined cohesion multiplier, which can determine at least in part the force pulling route poses together. A lower predetermined cohesion multiplier can reduce the cohesive strength of route portion 404 (e.g., draw of route poses towards it) and, in some cases, may cause a loss in smoothness of the path travelled by robot 202. In some cases, only sequential route poses exert cohesive forces on the points of one another. In other cases, all route poses exert cohesive forces on one another. In still other cases, some route poses exert cohesive forces on others. The determination of which route poses are configured to exert cohesive forces on one another can depend on a number of factors, which may vary on a case-by-case basis. For example, if a route is circular, it may be desirable for all route poses to exert cohesive forces on one another to tighten the circle. As another example, if the route is complex, then it may be desirable for certain complex paths to only have sequential route poses exert cohesive forces on one another. This limitation may allow robot 202 to make more turns and/or have more predictable results because other positioned route poses will not unduly influence it. Ones between the aforementioned examples in complexity may have some of the route poses exerting cohesive forces. As another example, the number of route poses may also be a factor. Having a lot of route poses on a route may cause unexpected results if all of them exert cohesive forces on one another. If there are fewer route poses, this might not be a problem, and all or some of the route poses can exert forces. In some cases, there can be a predetermined cohesive force distance threshold, where if a point on a first route pose is distance that is more than the predetermined cohesive force distance threshold (or more than or equal to, depending on how it is defined) from a point on a second route pose, the cohesive force can be zero or substantially zero.

In some implementations the cohesive force function and the repulsive force function can be the same force function. In other implementations, the cohesive force function and the repulsive force functions are separate. The cohesive force function can be used to determine the attractive forces from other route poses in accordance with block 458 from method 450. In some implementations, both the cohesive forces and repulsive forces can result in torsion (e.g., causing rotation) of a route pose.

As described with reference to intermediate layer 408, route poses 414 and 416 can experience different attractive and repulsive forces. In some implementations, the forces can be stored in arrays. For example, there can be an array of forces indicative of repulsion, torsion, cohesion, etc.

In some cases, forces can be toggled, such as by using an on/off parameter that can turn on or off any individual force and/or group of forces from a point. For example, the on/off parameter can be binary wherein one value turns the force on and another turns the force off. In this way, some forces can be turned off, such as based on the distance an object is from a route pose, whether a point is in the interior of an object or no go zone, distance between route poses, etc.

On the balance, the net forces on route poses 414 and 416 can reposition one or more of route poses 414 and 416. For example, route poses 414 and 416 can be displaced. Route poses 414 and 416 can displace (e.g., translated and/or rotated) until their net forces, in any direction, are substantially zero and/or minimized. In this way, route poses 414 and 416 can be displaced to locations indicative at least in part to an adjusted route for robot 202 to travel to avoid objects (e.g., obstacle 402). The translation and/or rotation of a route pose due to the repulsive forces and attractive forces can be determined in accordance with block 460 of method 450.

There can be different adjustments made to determining the displacement of route poses 414 and 416. For example, in some cases, instead of considering all forces on route poses 414 and 416, attractive forces may only be considered. Advantageously, such a system can allow robot 202 to stick to static paths. Based at least in part on the displacement of route poses 414 and 416, robot 202 can set a new path for the route planner. In the new path, the trajectory can be representative of a point on robot 202, such as the center of robot 202, as robot 202 travels the path.

After robot 202 determines the displacement of route poses 414 and 416, robot 202 can determine a path to travel. For example, based on the positions (e.g., locations and/or orientations) of route poses 414 and 416, robot 202 can determine the path to navigate to and/or between route poses 414 and 416, and/or any other route poses from its present location. In some cases, robot 202 will travel between consecutive (e.g., sequential) route poses in order, defining at least in part a path. For example, this determination can be based at least in part on an interpolation between route poses taking into account the path robot 202 can travel between those points. In many cases, linear interpolation can be used. By using performing interpolation, robot 202 can account for the translated and/or rotated route pose in accordance with block 462 in method 450.

Figure 5:
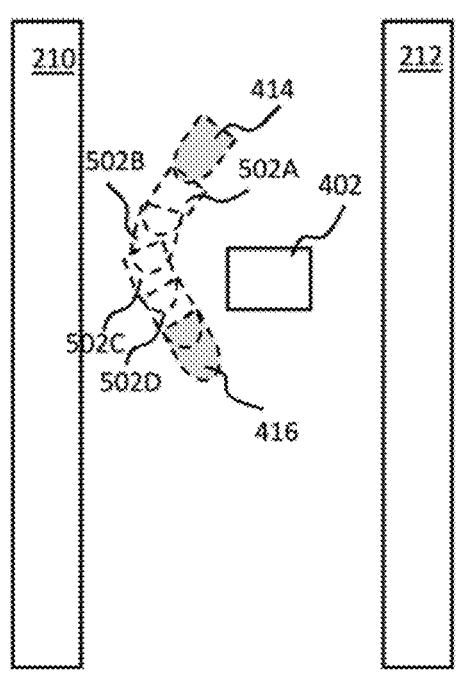
FIG. 5 is an overhead view of a diagram showing interpolation between route poses in accordance with some implementations of this disclosure.

FIG. 5 is an overhead view of a diagram showing interpolation between route poses 414 and 416 in accordance with some implementations of this disclosure. Based on forces placed on route poses 414 and 416, as described herein, route poses 414 and 416 have displaced. As illustrated, route pose 414 has both translated and rotated. The translation can be measured in standard units, such as inches, feet, meters, or any other unit of measurement (e.g., measurements in the metric, US, or other system of measurement) and/or relative/non-absolute units, such as ticks, pixels, percentage of range of a sensor, and the like. Rotation can be measured in degrees, radians, etc. Similarly, route pose 416 has also been translated and/or rotated. Notably, both route poses 414 and 416 clear obstacle 402. Since route poses 414 and 416 represent discretized locations along a path travelled by robot 202, robot 202 can interpolate between them to determine the path it should take. Interpolated poses 502A-502D illustrate a path travelled between route poses 414 and 416. Notably, robot 202 may also interpolate other paths (not illustrated) to move to route poses and/or between route poses.

Interpolated poses 502A-502D can have associated footprints substantially similar to the footprints of one or more of route poses 414 and 416. In some cases, as illustrated in FIG. 5, interpolated poses 502A-502D can be interpolated route poses. Accordingly, interpolated poses 502A-502D can represent the position and/or orientation that robot 202 would be along a route. Advantageously, this can allow the interpolated path to guide robot 202 to places where robot 202 would fit. Moreover, interpolated poses 502A-502D can be determined such that there is no overlap between the footprint of any one of interpolated poses 502-502D and an object (e.g., obstacle 402, object 210, or object 212), thereby avoiding collisions.

Interpolated poses 502A-502D can also be determined taking into account the rotation and/or translation to get from route pose 414 to route pose 416. For example, robot 202 can determine the pose of route pose 414 and the pose of route pose 416. Robot 202 can then find the difference between the poses of route poses 414 and route poses 416, and then determine how to get from the pose of route pose 414 to the pose of route pose 416. For example, robot 202 can distribute the rotation and translation between interpolated poses 502A-502D such that robot 202 would rotate and translate from route pose 414 to route pose 416. In some cases, robot 202 can distribute the rotation and translation substantially equally between interpolated poses 502A-502D. For example, if there are N number of interpolation positions, robot 202 can divide the difference in location and rotation of the poses of route poses 414 and 416 substantially evenly across those N number of interpolation positions. Alternatively, robot 202 can divide the difference in location and/or rotation of the poses of route poses 414 and 416 un-evenly across those N number of interpolation positions. Advantageously, even division can allow for robot 202 to travel smoothly from route pose 414 to route pose 416. However, un-even division can allow robot 202 to more easily account for and avoid objects by allowing finer movements in some areas as compared to others. For example, in order to avoid an object in which interpolated poses 502A-502D comes near, robot 202 would have to make a sharp turn. Accordingly, more interpolated poses around that turn may be desirable in order to account for the turn. In some cases, the number of interpolation positions can be dynamic, and more or fewer than N number of interpolation positions can be used as desired.

Figure 6:
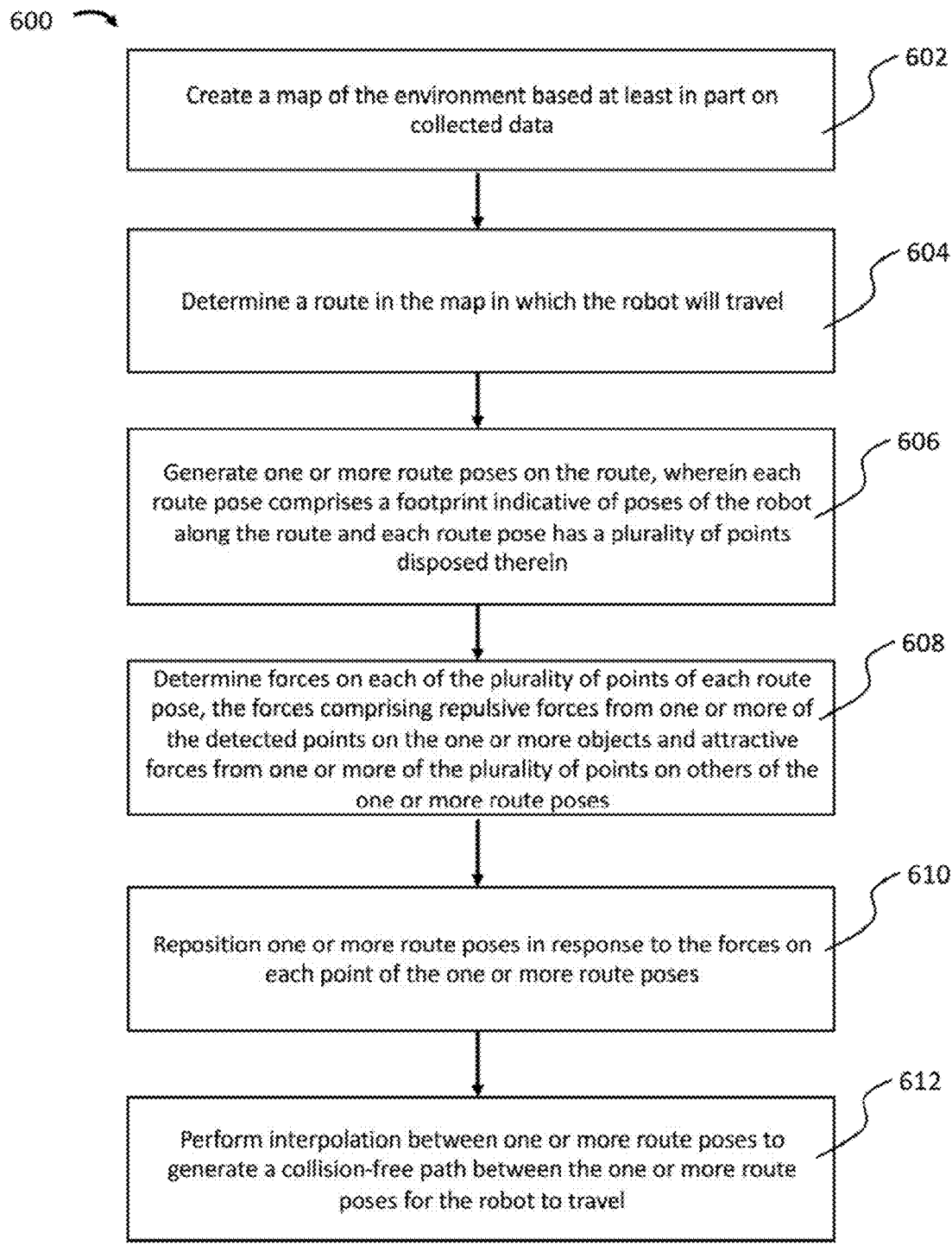
FIG. 6 is a process flow diagram of an exemplary method for operation of a robot in accordance with some implementations of this disclosure.

FIG. 6 is a process flow diagram of an exemplary method 600 for operation of a robot in accordance with some implementations of this disclosure. Block 602 includes creating a map of the environment based at least in part on collected data. Block 604 includes determining a route in the map in which the robot will travel. Block 606 includes generating one or more route poses on the route, wherein each route pose comprises a footprint indicative of poses of the robot along the route and each route pose has a plurality of points therein. Block 608 includes determining forces on each of the plurality of points of each route pose, the forces comprising repulsive forces from one or more of the detected points on the one or more objects and attractive forces from one or more of the plurality of points on others of the one or more route poses. Block 610 includes repositioning each route pose in response to the forces on each point of each route pose. Block 612 includes perform interpolation between the one or more repositioned route poses to generate a collision-free path between the one or more route poses for the robot to travel.

Figure 7:
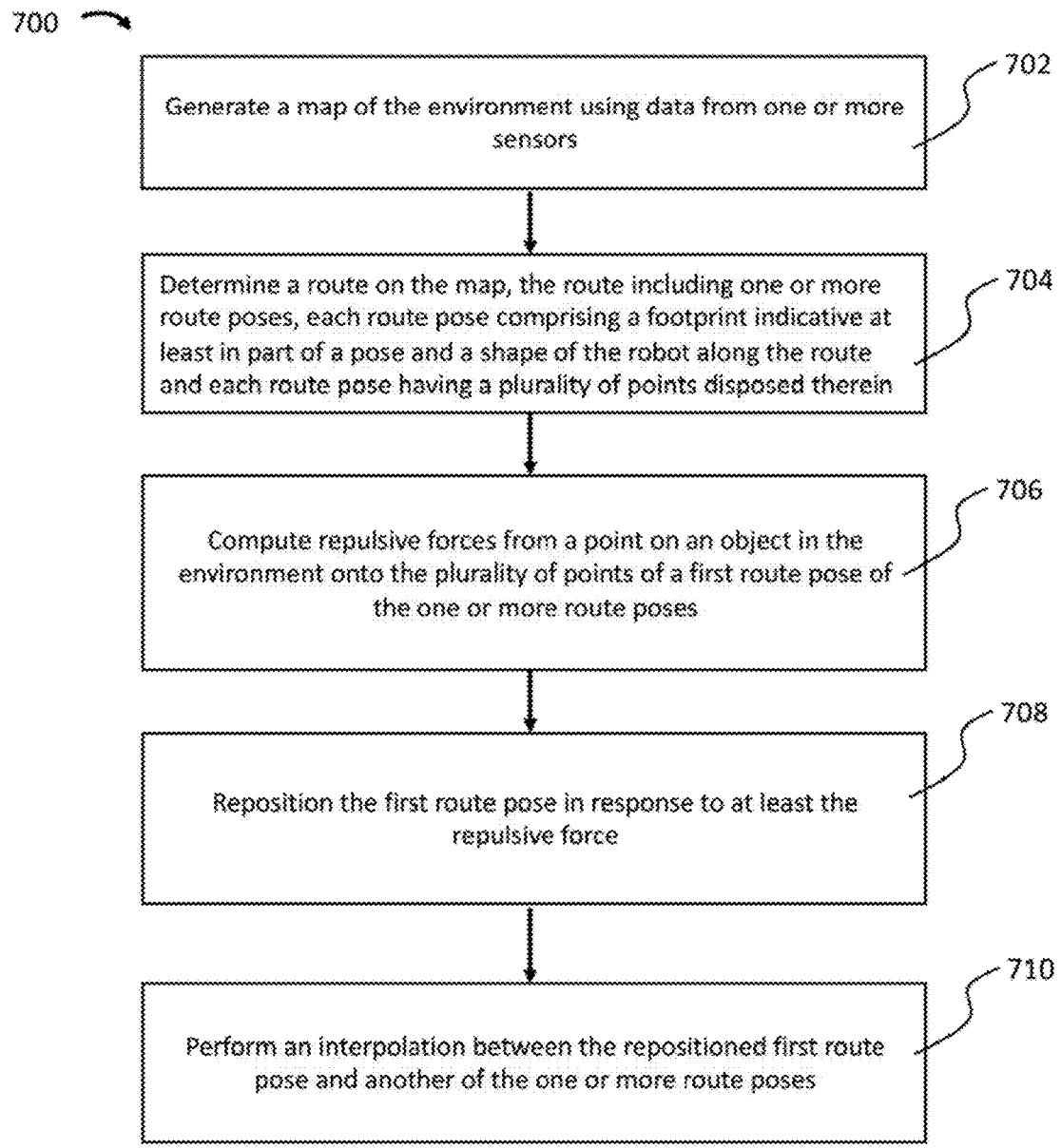
FIG. 7 is a process flow diagram of an exemplary method for operation of a robot in accordance with some implementations of this disclosure.

FIG. 7 is a process flow diagram of an exemplary method 700 for operation of a robot in accordance with some implementations of this disclosure. Block 702 includes generating a map of the environment using data from one or more sensors. Block 704 includes determining a route on the map, the route including one or more route poses, each route pose comprising a footprint indicative at least in part of a pose, size, and shape of the robot along the route and each route pose having a plurality of points therein. Block 706 includes computing repulsive forces from a point on an object in the environment onto the plurality of points of a first route pose of the one or more route poses. Block 708 includes repositioning the first route pose in response to at least the repulsive force. Block 710 includes performing an interpolation between the repositioned first route pose and another of the one or more route poses.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software may be rendered in any programming language or environment including, for example, C/C++, C#, Fortran, COBOL, MATLAB™, PASCAL, Python, assembly language, markup languages (e.g., HTML, SGML, XML, VoXWL), and the like, as well as object-oriented environments such as the Common Object Request Broker Architecture ("CORBA"), JAVA™ (including J2ME, Java Beans, etc.), Binary Runtime Environment (e.g., BREW), and the like.

As used herein, connection, link, transmission channel, delay line, and/or wireless can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A robot comprising:
   one or more sensors configured to collect data about an environment including detected points on one or more objects in the environment; and
   a controller configured to:
   create a map of the environment based at least in part on the collected data;
   determine a route in the map in which the robot will travel;
   generate one or more route poses on the route, wherein each route pose comprises a footprint indicative of poses of the robot along the route and each route pose has a plurality of points disposed therein;
   determine forces on each of the plurality of points of each route pose, the forces comprising repulsive forces from one or more of the detected points on the one or more objects and attractive forces from one or more of the plurality of points on others of the one or more route poses;
   reposition one or more route poses in response to the forces on each point of the one or more route poses; and
   perform interpolation between one or more route poses to generate a collision-free path between the one or more route poses for the robot to travel.

2. The robot of claim 1, wherein:
   the one or more route poses form a sequence in which the robot travels along the route; and
   the interpolation comprises a linear interpolation between sequential ones of the one or more route poses.

3. The robot of claim 1, wherein the interpolation generates one or more interpolation route poses having substantially similar footprints to the footprint of each route pose.

4. The robot of claim 1, wherein the determination of the forces on each point of the one or more route poses further comprises a computation of a force function that associates, at least in part, the forces on each point of each route pose with one or more characteristics of objects in the environment.

5. The robot of claim 4, wherein the one or more characteristics includes one or more of distance, shape, material, and color.

6. The robot of claim 4, wherein:
   the force function associates zero repulsive force exerted by a first detected point on a first object where a distance between the first detected point and a second point of a first route pose is above a predetermined distance threshold.

7. The robot of claim 1, wherein the footprint of each route pose has substantially similar size and shape as the footprint of the robot.

8. The robot of claim 1, wherein the robot comprises a floor cleaner.

9. A method for dynamic navigation of a robot in an environment, comprising:
   generating a map of the environment using data from one or more sensors;
   determining a route on the map, the route including one or more route poses, each route pose comprising a footprint indicative at least in part of a pose and a shape of the robot along the route and each route pose having a plurality of points disposed therein;
   computing repulsive forces from a point on an object in the environment onto the plurality of points of a first route pose of the one or more route poses;
   repositioning the first route pose in response to at least the repulsive forces; and
   performing an interpolation between the repositioned first route pose and another of the one or more route poses.

10. The method of claim 9, further comprising determining attractive forces from a point on another of the one or more route poses exerted on the plurality of points of the first route pose.

11. The method of claim 9, further comprising:
    detecting a plurality of objects in the environment with the one or more sensors, each of the plurality of objects having detected points; and
    defining a force function, the force function computing repulsive forces exerted by each of the detected points of the plurality of objects on the plurality of points of the first route pose, wherein each repulsive force comprises a vector.

12. The method of claim 11, wherein the repositioning of the first route pose comprises calculating a minimum of the force function.

13. The method of claim 9, wherein the repositioning of the first route pose comprises translating and rotating the first route pose.

14. The method of claim 9, wherein the performing of the interpolation comprises:
generating an interpolation route pose having a footprint substantially similar to the shape of the robot; and
determining a translation and rotation of the interpolation route pose based at least on a collision-free path between the translated and rotated first route pose and the another of the one or more route poses.

15. The method of claim 9, further comprising computing a magnitude of the repulsive forces as proportional to a distance between the point on the object and each of the plurality of points of the first route pose if the point on the object is outside of the footprint of the first route pose.

16. The method of claim 9, further comprising computing a magnitude of the repulsive forces as inversely proportional to a distance between the point on the object and each of the plurality of points of the first route pose if the point on the object is inside the footprint of the first route pose.

17. The method of claim 9, further comprising computing torque forces onto the plurality of points of the first route pose due to the repulsive forces.

18. A non-transitory computer-readable storage apparatus having a plurality of instructions stored thereon, the instructions being executable by a processing apparatus to operate a robot, the instructions configured to, when executed by the processing apparatus, cause the processing apparatus to:
generate a map of an environment using data from one or more sensors;
determine a route on the map, the route comprising one or more route poses, each route pose comprising a footprint indicative at least in part of a pose and a shape of the robot along the route and each route pose having a plurality of points disposed therein; and
compute repulsive forces from a point on an object in the environment onto the plurality of points of a first route pose of the one or more route poses.

19. The non-transitory computer-readable storage apparatus of claim 18, further comprising one or more instructions, which when executed by the processing apparatus, further cause the processing apparatus to determine attractive forces from a point on another of the one or more route poses exerted on the plurality of points of the first route pose.

20. The non-transitory computer-readable storage apparatus of claim 18, further comprising one or more instructions, which when executed by the processing apparatus, further cause the processing apparatus to determine torque forces from a point on another of the one or more route poses exerted on the plurality of points of the first route pose.

* * * * *